(12) United States Patent
Harita

(10) Patent No.: US 7,735,183 B2
(45) Date of Patent: Jun. 15, 2010

(54) VEHICLE WIPER/WASHER CONTROL APPARATUS AND VEHICLE WIPER/WASHER APPARATUS

(75) Inventor: Yasuhiro Harita, Kosai (JP)

(73) Assignee: ASMO Co., Ltd. (JP)

( * ) Notice: Subject to any disclaimer, the term of this patent is extended or adjusted under 35 U.S.C. 154(b) by 612 days.

(21) Appl. No.: 11/762,548

(22) Filed: Jun. 13, 2007

(65) Prior Publication Data

US 2008/0229537 A1 Sep. 25, 2008

(30) Foreign Application Priority Data

Jun. 29, 2006 (JP) .............................. 2006-179602

(51) Int. Cl.
*B60S 1/46* (2006.01)
*B60S 1/48* (2006.01)

(52) U.S. Cl. ................. 15/250.02; 15/250.04; 318/445; 318/DIG. 2; 239/284.1

(58) Field of Classification Search . 15/250.01–250.04, 15/250.12; 318/DIG. 2, 443, 444, 483, 445; 239/284.1, 284.2

See application file for complete search history.

(56) References Cited

U.S. PATENT DOCUMENTS 4,393,341 A * 7/1983 Byrne ........................ 318/443

5,105,134 A * 4/1992 Shimizu et al. .............. 318/445
7,615,955 B2 * 11/2009 Harita et al. ................ 318/483

FOREIGN PATENT DOCUMENTS

JP 05-185908 7/1993

\* cited by examiner

*Primary Examiner*—Gary K Graham
(74) *Attorney, Agent, or Firm*—Colin P. Cahoon; Carstens & Cahoon, LLP

(57) ABSTRACT

If a washer switch is turned on in a state in which a wiper determining portion determines that a wiper switch is in an OFF state, and a vehicle speed determining portion determines that a vehicle speed is equal to or more than a predetermined speed, a simultaneous operation control portion ejects the washer fluid in a state in which the wiper is positioned at a lower reversing position. The simultaneous operation control portion causes the wiper to reciprocate at least once simultaneously with the ejection. The simultaneous operation control portion additionally ejects the washer fluid at least once, in a state in which the wiper is positioned at an intermediate position between the lower reversing position and an upper reversing position. Accordingly, it is possible to inhibit a lack of the washer fluid from being generated on the surface to be wiped.

9 Claims, 5 Drawing Sheets

VEHICLE WIPER/WASHER CONTROL APPARATUS AND VEHICLE WIPER/WASHER APPARATUS

BACKGROUND OF THE INVENTION

The present invention relates to a vehicle wiper/washer control apparatus, and a vehicle wiper/washer apparatus provided with the control apparatus. The control apparatus simultaneously performs ejection of a washer fluid onto a surface to be wiped in a windshield exposed to a relative wind, with wiping of the surface to be wiped by a wiper.

A vehicle wiper/washer control apparatus disclosed in Japanese Laid-Open Patent Publication No. 5-185908 simultaneously operates a wiper apparatus and a washer apparatus. If a washer switch is turned on, the wiper/washer control apparatus controls the washer apparatus in such a manner as to eject (supply) washer fluid onto a surface to be wiped. Further, the wiper/washer control apparatus controls the wiper apparatus in such a manner as to start wiping the surface to be wiped by a wiper. A wiper blade pivots in a reciprocating manner between a lower reversing position and an upper reversing position.

There has been known a wiper/washer apparatus on which a washer nozzle is directly arranged in a wiper arm or a wiper blade, which are wiper components. In this case, the washer fluid is ejected to the surface to be wiped at a close proximity. Accordingly, the washer fluid ejected from the wiper is hard to be affected by a relative wind before reaching the surface to be wiped. Accordingly, it is easy to supply the washer fluid to a desired place on the surface to be wiped.

In the case of operating the washer apparatus provided with a washer nozzle in the wiper component simultaneously with the wiper apparatus as described in the publication mentioned above, the washer fluid is supplied to the surface to be wiped in a state in which the wiper blade is positioned at a lower end of a windshield. In other words, in a state in which the wiper blade is parallel to a vehicle width direction, the washer fluid is ejected to the surface to be wiped. In a state in which the wiper blade is parallel to a vehicle width direction, the relative wind is simultaneously applied to a distal end and a proximal end of the wiper blade. This state is referred to as a state in which the wiper blade extends perpendicular to the relative wind. The wiper sweeps and spreads the washer fluid on the surface to be wiped, on the basis of the pivoting motion in a reciprocating manner.

However, there is a case where the relative wind moves the washer fluid on the surface to be wiped along the wiper blade in a state of being perpendicular to the vehicle width direction. In general, since the vehicle windshield is inclined, the relative wind is brought into contact with the proximal end of the wiper blade in the state in which the wiper blade is perpendicular to the vehicle width direction, flows along the wiper blade, and passes through the distal end of the wiper blade. The state in which the wiper blade is perpendicular to the vehicle width direction is referred to as a state in which the wiper blade is parallel to the relative wind. In this case, there is a risk that the washer fluid on the surface to be wiped is concentrated at the distal end of the wiper blade. In other words, the washer fluid on the surface to be wiped moves toward an upper end of the windshield. Particularly, when the vehicle runs at a high speed and the relative wind is strong, the uneven distribution of the washer fluid is significant. Since the washer fluid on the surface to be wiped is exposed to a centrifugal force on the basis of the rotation together with the wiper blade, the washer fluid tends to be concentrated at the distal end of the wiper blade.

Accordingly, there is a risk that the washer fluid on the surface to be wiped becomes insufficient in a portion corresponding to the proximal end of the wiper blade. Particularly, when the vehicle runs at a high speed and the relative wind is strong, the washer fluid can be insufficient.

SUMMARY OF THE INVENTION

An objective of the present invention is to provide a vehicle wiper/washer control apparatus which can inhibit lack of a washer fluid from being generated on a surface to be wiped. Another objective of the present invention is to provide a vehicle wiper/washer apparatus provided with the control apparatus.

In accordance with one aspect of the present invention, a vehicle wiper/washer control apparatus which controls a wiper motor and a washer motor is provided. The wiper motor is driven for wiping a surface to be wiped in a vehicle windshield by a wiper. The wiper reciprocates between a first reversing position and a second reversing position. The wiper is provided with an ejecting portion for ejecting a washer fluid to the surface to be wiped. The washer motor is driven for ejecting the washer fluid from the ejecting portion. The control apparatus drives the washer motor in a case where a washer switch is turned on. The control apparatus is provided with a vehicle speed determining portion determining whether or not a vehicle speed is equal to or higher than a predetermined speed. A wiper determining portion determines whether or not the wiper switch operated for driving the wiper motor is in an OFF state. In the case where the wiper switch is in the OFF state, the wiper is arranged at the first reversing position. If the washer switch is turned on in a state in which the wiper determining portion determines that the wiper switch is in the OFF state, and the vehicle speed determining portion determines that the vehicle speed is equal to or higher than the predetermined speed, a simultaneous operation control portion ejects the washer fluid in the state in which the wiper is positioned at the first reversing position. Further, the simultaneous operation control portion causes the wiper to reciprocate at least once simultaneously with the ejection. The simultaneous operation control portion additionally ejects the washer fluid at least once in a state in which the wiper is positioned at an intermediate position between the first reversing position and the second reversing position.

Other aspects and advantages of the invention will become apparent from the following description, taken in conjunction with the accompanying drawings, illustrating by way of example the principles of the invention.

BRIEF DESCRIPTION OF THE DRAWINGS

The features of the present invention that are believed to be novel are set forth with particularity in the appended claims. The invention, together with objects and advantages thereof, may best be understood by reference to the following description of the presently preferred embodiments together with the accompanying drawings in which:

DETAILED DESCRIPTION OF THE PREFERRED EMBODIMENT

A description will be given below of an embodiment according to the present invention with reference to FIGS. 1 to 5.

Figure 1:
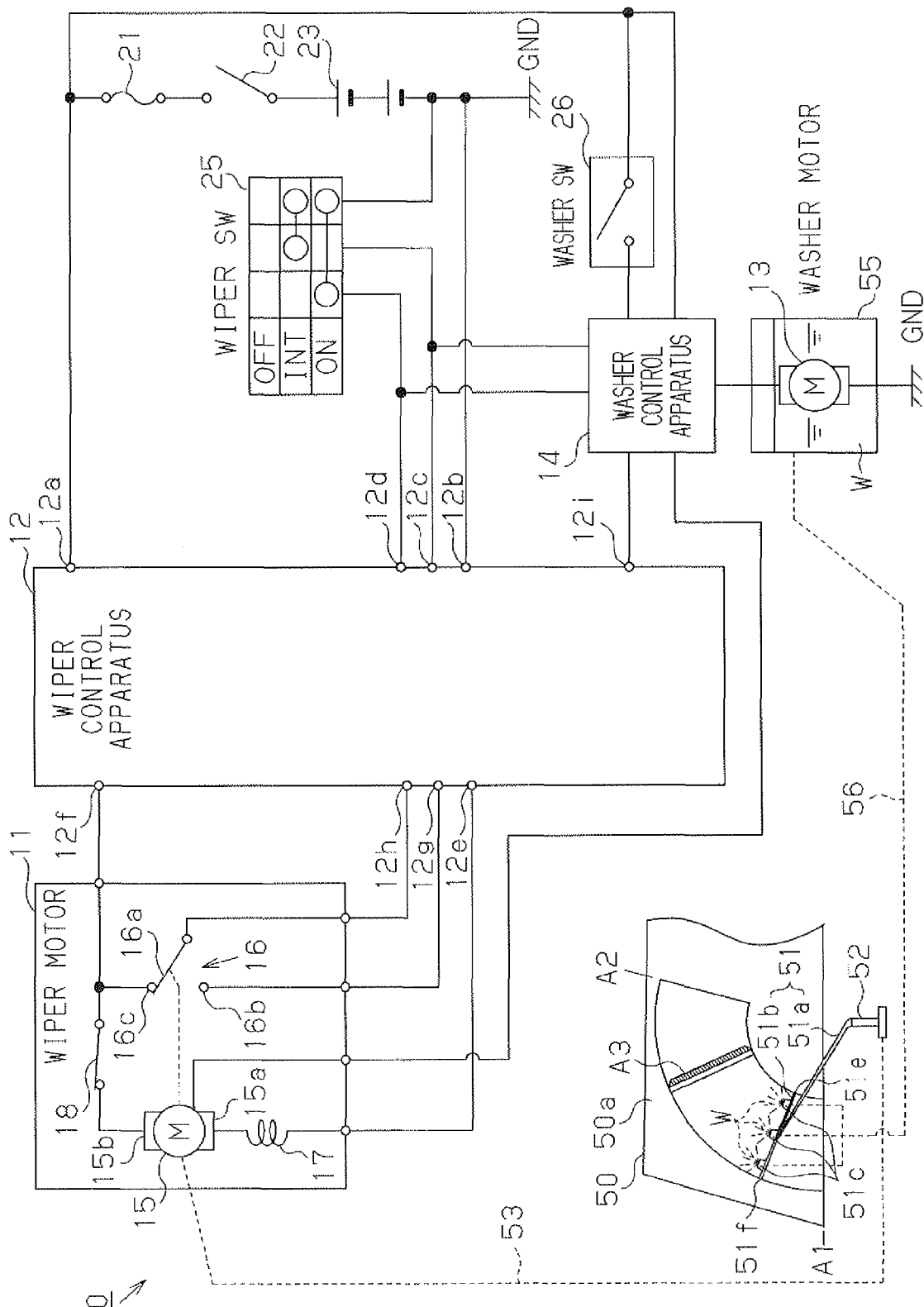
FIG. 1 is a block diagram of a wiper/washer apparatus in accordance with one embodiment of the present invention.

FIG. 1 shows a vehicle wiper/washer apparatus 10 in accordance with the embodiment. The vehicle wiper/washer apparatus 10 is provided with a wiper 51 that is caused to pivot in a reciprocating manner for wiping a surface to be wiped 50a in a windshield 50 of a vehicle, a wiper motor 11 causing the wiper 51 to pivot in a reciprocating manner, and a wiper control apparatus 12 controlling the wiper motor 11. Further, the vehicle wiper/washer apparatus 10 is provided with a washer motor 13 driven for drawing a washer fluid W within a washer tank 55, and a washer control apparatus 14 controlling the washer motor 13. The washer motor 13 is attached to the washer tank 55. The vehicle wiper/washer apparatus 10 causes the wiper 51 to pivot in a reciprocating manner, simultaneously with ejection of the washer fluid W to the surface to be wiped 50a.

The wiper 51 is provided with a wiper arm 51a fixed to a pivot shaft 52 that is caused to pivot by the wiper motor 11, and a wiper blade 51b attached to the wiper arm 51a. The wiper arm 51a has a proximal end fixed to the pivot shaft 52, and a distal end coupled to the wiper blade 51b. A radius of pivoting motion of a proximal end 51e of the wiper blade 51b is smaller than a radius of pivoting motion of a distal end 51f of the wiper blade 51b. Since the wiper motor 11 causes the pivot shaft 52 to reciprocate and pivot in a predetermined angle range, the wiper 51 pivots in a reciprocating manner in a predetermine angle range on the surface to be wiped 50a. As a result, the wiper 51 wipes the surface to be wiped 50a.

A wiping range of the wiper 51, that is, a wiping range of the wiper blade 51b exists between a lower reversing position A1 and an upper reversing position A2. The lower reversing position A1 corresponding to a first reversing position is set to a lower end of the windshield 50. In other words, the wiper blade 51b positioned at the lower reversing position A1 extends parallel to a vehicle width direction. The wiper blade 51b positioned at the upper reversing position A2 corresponding to the second reversing position is somewhat beyond a position which is perpendicular to the vehicle width direction. In other words, the wiper blade 51b positioned at the upper reversing position A2 is somewhat inclined to an opposite side to the lower reversing position A1, with respect to a line which is perpendicular to the vehicle width direction. The wiper blade 51b positioned at the lower reversing position A1 is perpendicular to the relative wind. The wiper blade 51b positioned at the upper reversing position A2 is somewhat inclined from a line which is parallel to the relative wind. The wiper 51 in a stop state is positioned at the lower reversing position A1. In other words, the stop position of the wiper 51 is set to the lower reversing position A1.

Figure 3:
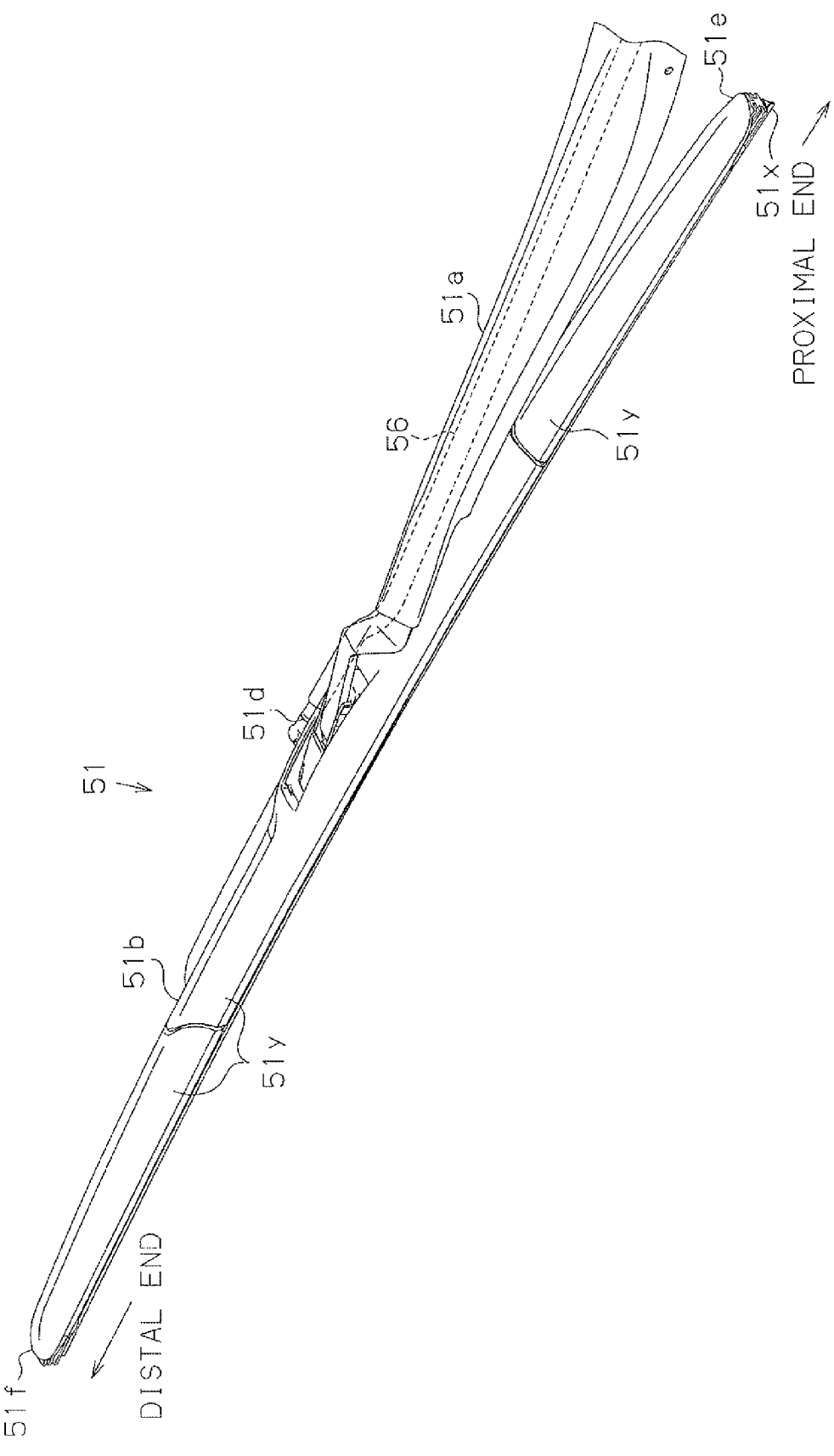
FIG. 3 is an enlarged perspective view of the wiper shown in FIG. 1.
Figure 4:
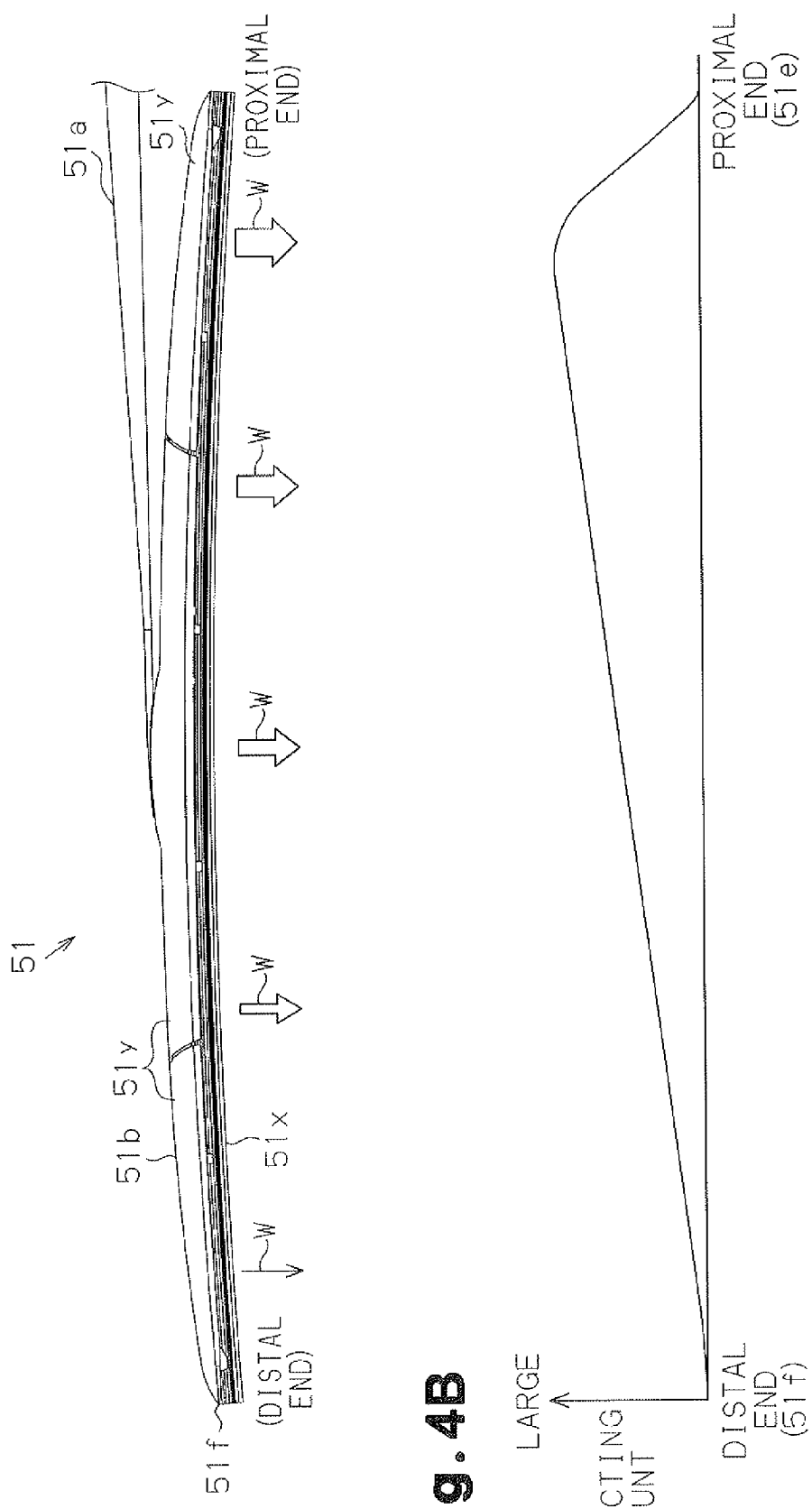
FIG. 4A is a side elevational view of the wiper shown in FIG. 3.
FIG. 4B is a graph showing a distribution of a washer fluid in the wiper in FIG. 4A.

As shown in FIG. 3, the wiper blade 51b has a lever assembly (not shown) holding a blade rubber 51x, and a cover member 51y covering the lever assembly. The lever assembly includes a plurality of levers coupled like a tournament chart, and the levers are attached to a distal end of the wiper arm 51a. A washer nozzle (not shown) is equipped in the cover member 51y. The washer nozzle has five ejecting portions 51c for ejecting the washer fluid W toward the surface to be wiped 50a (only three of the ejecting portions are shown in FIG. 1). The five ejecting portions 51c are arranged at a uniform interval in a longitudinal direction of the wiper blade 51b. The middle ejecting portion 51c is positioned at the center of the wiper arm 51a in the longitudinal direction. The washer nozzle has a coupling portion 51d exposed from the cover member 51y. The coupling portion 51d is connected to the washer motor 13 via a washer hose 56. The washer hose 56 is arranged in such a manner as to extend along the wiper arm 51a.

The washer motor 13 draws the washer fluid W from the washer tank 55 by driving a washer pump (not shown) so as to eject the washer fluid W to the surface to be wiped 50a from each of the ejecting portions 51c through the washer hose 56 at a close proximity.

A description will be in detail given below of the wiper control apparatus 12. The wiper control apparatus 12 has a power source terminal 12a, a first GND terminal 12b, a first input terminal 12c, a second input terminal 12d, a first feed terminal 12e, a second GND terminal 12f, a second feed terminal 12g, a wiper position input terminal 12h, and a monitor terminal 12i. The power source terminal 12a is connected to a positive terminal of a vehicle battery 23 via a fuse 21 and an ignition switch 22. A negative terminal of the vehicle battery 23 and the first GND terminal 12b are connected to a GND corresponding to a vehicle body earth position. In the case where the ignition switch 22 is in an ON state, the vehicle battery 23 supplies a driving power to the wiper control apparatus 12.

A wiper switch 25 provided in the vicinity of a vehicle driver seat is connected to the wiper control apparatus 12. The wiper switch 25 is switched to any one of three operation positions comprising an OFF position, an INT position, and an ON position by being manipulated by an operator. In the wiper switch 25 in a state of being switched to the INT position corresponding to an intermittent working position, the first input terminal 12c is in a GND level (an L level). In the wiper switch 25 in a state of being switched to the ON position corresponding to a continuous working position, the second input terminal 12d is in the GND level (the L level). In the wiper switch 25 in a state of being switched to the OFF position, the first input terminal 12c and the second input terminal 12d are disconnected from the GND, and are in an H level. The wiper control apparatus 12 determines, on the basis of electric potentials of the first input terminal 12c and the second input terminal 12d, at which of the OFF position, the INT position and the ON position the wiper switch 25 is.

The wiper motor 11 is provided with a wiper motor main body 15, and a fixed position stop switch 16. The wiper motor main body 15 has a direct-current motor serving as a drive source, and a speed reduction mechanism integrally assembled in the direct-current motor. The fixed position stop switch 16 arranges the wiper 51 in a stop state at the lower reversing position A1. In the case where the wiper 51 is positioned at the lower reversing position A1, the fixed position stop switch 16 is in the OFF state, and in the case where the wiper 51 is positioned at any position other than the lower reversing position A1, the fixed position stop switch 16 is in the ON state.

The direct-current motor has a first brush 15a and a second brush 15b. The first brush 15a is connected to the first feed terminal 12e via a choke coil 17 for preventing a noise. The second brush 15b is connected to the second GND terminal 12f via a breaker 18 corresponding to an overheat protection element. The driving power is supplied to the wiper motor main body 15 from the first feed terminal 12e, whereby the wiper motor main body 15 is driven. A link mechanism 53 for causing the pivot shaft 52 to pivot in a reciprocating manner is connected to an output shaft of the wiper motor main body 15. The link mechanism 53 converts the rotating motion of the wiper motor main body 15 into a pivoting motion in a reciprocating manner of the pivot shaft 52. As a result, the wiper 51 reciprocates and oscillates (pivots in a reciprocating manner).

The fixed position stop switch 16 has a movable contact 16a, an ON contact 16b, and an OFF contact 16c. The movable contact 16a is switched so as to be brought into contact with either of the ON contact 16b or the OFF contact 16c. The movable contact 16a is connected to the wiper position input terminal 12h. The ON contact 16b is connected to the second feed terminal 12g. The OFF contact 16c is connected to the second GND terminal 12f. The movable contact 16a rotates simultaneously with the output shaft of the wiper motor main body 15. In a state in which the wiper 51 (the wiper blade 51b) is positioned at the lower reversing position A1, the movable contact 16a is connected to the OFF contact 16c. In a state in which the wiper 51 is positioned at any position other than the lower reversing position A1, the movable contact 16a is connected to the ON contact 16b. Accordingly, in the case where the wiper 51 is positioned at the lower reversing position A1, the wiper position input terminal 12h is in the GND level (the L level), and in the case where the wiper 51 is positioned at any position other than the lower reversing position A1, the wiper position input terminal 12h is in the H level. The wiper control apparatus 12 determines, on the basis of the electric potential of the wiper position input terminal 12h, whether the wiper 51 is positioned at the lower reversing position A1 or at another position.

If the wiper control apparatus 12 detects the fact that the operator manipulates the wiper switch 25 so as to switch to the INT position or the ON position, the wiper control apparatus 12 supplies the driving power to the wiper motor 11. As a result, the wiper 51 executes a wiping motion. If the wiper 51 is detached from the lower reversing position A1, the fixed position stop switch 16 is switched to the ON state from the OFF state. If the wiper switch 25 is switched to the OFF position at a time when the wiper 51 is positioned at any position other than the lower reversing position A1, the wiper control apparatus 12 keeps supplying the driving power to the wiper motor 11 until the wiper 51 is returned to the lower reversing position A1. If the wiper 51 is returned to the lower reversing position A1, the fixed position stop switch 16 is switched to the OFF state from the ON state.

A description will be in detail given below of the washer control apparatus 14. The washer control apparatus 14 is connected to the positive terminal of the vehicle battery 23 via the fuse 21 and the ignition switch 22. In the case where the ignition switch 22 is in the ON state, the vehicle battery 23 supplies the driving power to the washer control apparatus 14. The washer control apparatus 14 applies a driving voltage to a washer switch 26 arranged in the vehicle driver seat. The washer switch 26 outputs ON/OFF signals to the washer control apparatus 14 by using the applied driving voltage.

Figure 2:
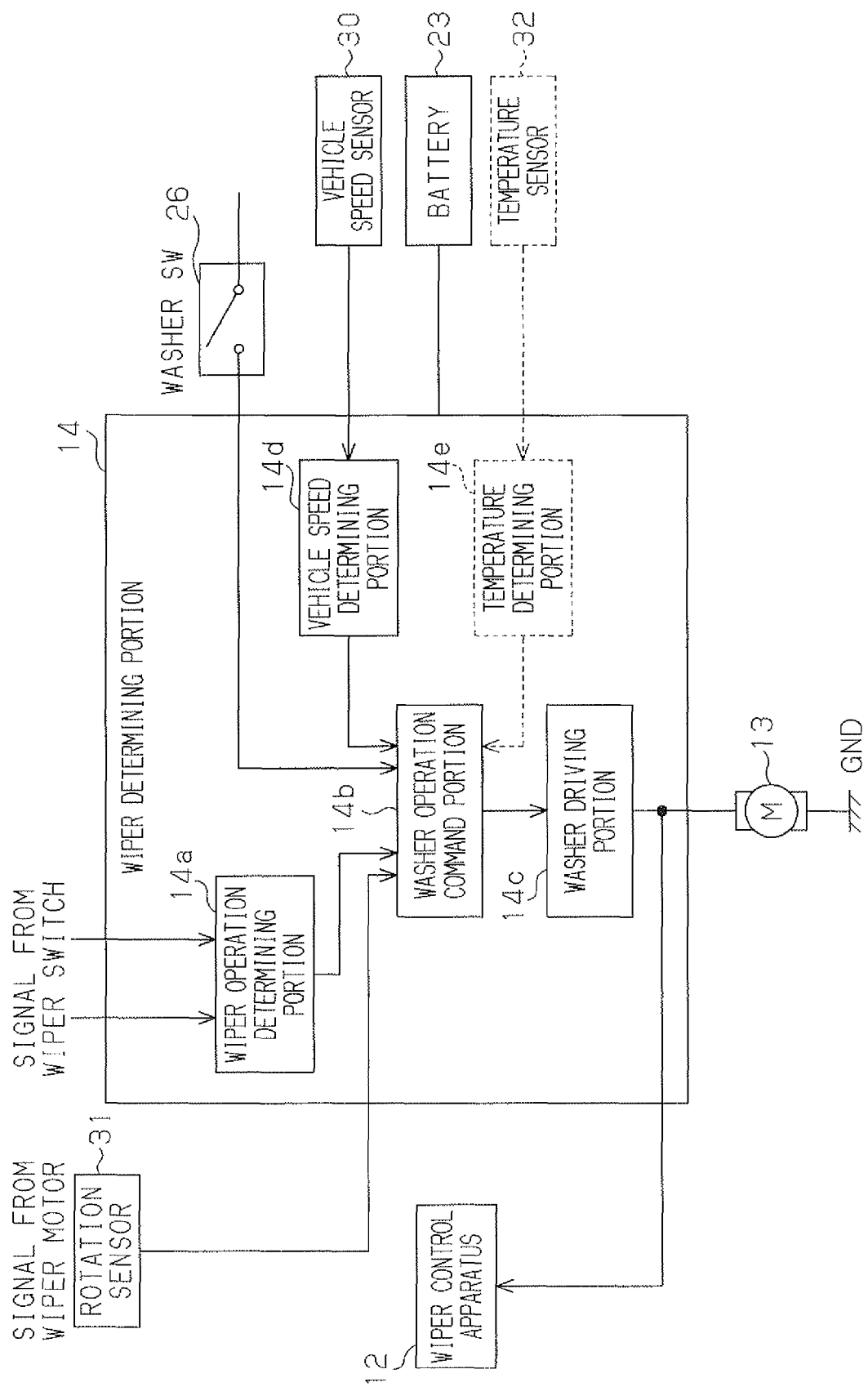
FIG. 2 is a block diagram of the washer control apparatus shown in FIG. 1.

As shown in FIG. 2, specifically, the washer control apparatus 14 is provided with a wiper determining portion 14a, a washer command portion 14b, a washer driving portion 14c and a vehicle speed determining portion 14d. The wiper determining portion 14a serving as a wiper operation determining portion is connected to the wiper switch 25. The wiper determining portion 14a determines an operating state of the wiper 51 by receiving a signal from the wiper switch 25, and outputs a result of determination to the washer command portion 14b. The washer command portion 14b serving as the washer operation command portion is connected to the washer switch 26. The washer command portion 14b determines ON/OFF states of the washer switch 26, and outputs a result of determination to the washer driving portion 14c.

If the operator turns on the washer switch 26, the washer command portion 14b supplies the driving power to the washer motor 13. As a result, the washer motor 13 draws the washer fluid W in the washer tank 55 so as to pressure feed the fluid W to the ejecting portions 51c. As shown in FIG. 1, the washer command portion 14b also applies the driving power to the monitor terminal 12i. In other words, the wiper control apparatus 12 monitors the voltage value of the driving power source.

If the operator turns on the washer switch 26 in the case where the wiper determining portion 14a determines that "the wiper 51 is in operation", the washer command portion 14b actuates the washer motor 13 only during the time when the washer switch 26 is turned on. In other words, in the case where the wiper 51 is in operation, the washer fluid W is ejected to the surface to be wiped 50a during the time when the operator turns on the washer switch.

If the operator turns on the washer switch 26 in the case where the wiper determining portion 14a determines that "the wiper 51 is not in operation", the washer command portion 14b actuates the washer motor 13 and the wiper motor 11 at a predetermined timing. In other words, the washer command portion 14b causes the wiper 51 to pivot in a reciprocating manner simultaneously with the ejection of the washer fluid W. A first predetermined time T1 for determining whether or not the ejection of the washer fluid W is continued is set in the washer control apparatus 14. If the washer switch 26 is continuously turned on for the first predetermined time T1 or more, the washer control apparatus 14 continues the washer fluid W during the ON operation. On the other hand, in the case where the ON operation period of the washer switch 26 is less than the first predetermined time T1, the washer control apparatus 14 ejects the washer fluid W for the first predetermined time T1. The present embodiment controls the ejection of the washer fluid W in the case where the ON operation period of the washer switch 26 is less than the first predetermined time T1, depending on the vehicle speed.

A result of determination of the vehicle speed determining portion 14d is input to the washer command portion 14b. The vehicle speed determining portion 14d determines, on the basis of a vehicle speed signal from a vehicle speed sensor 30 mounted on the vehicle, whether the vehicle is running at a low speed or running at a high speed. In the present embodiment, a threshold value for determining the vehicle speed is set to 80 km/h.

The wiper motor main body 15 has a rotation sensor 31 detecting a rotation of the output shaft. The rotation sensor 31 inputs a rotation detecting signal synchronizing with the rotation of the output shaft to the washer command portion 14b. The washer command portion 14b detects a rotational position of the direct-current motor, that is, the position of the wiper 51, on the basis of the rotation detecting signal. An intermediate ejecting position A3 corresponding to an intermediate position between the lower reversing position A1 and the upper reversing position A2 is set in the washer control apparatus 14. The intermediate ejecting position A3 is set in advance on the basis of a measurement and a calculation per type of vehicle. In the present embodiment, the intermediate ejecting position A3 is set at a position which is inclined at ten-odd degrees toward the lower reversing position A1 from a position at which the wiper blade 51b is perpendicular to the vehicle width direction. In other words, the intermediate ejecting position A3 is inclined at ten-odd degrees toward the lower reversing position A1 from a position at which the wiper blade 51b is parallel to the relative wind.

First, a description will be given of an operation at a time when the vehicle runs at a low speed. If the operator turns on the washer switch 26 in the case where the vehicle speed is lower than 80 km/h, and the wiper 51 is not in operation, the washer command portion 14b first actuates the washer motor 13 for a first predetermined time T1 for ejecting the washer fluid W at a predetermined amount to the surface to be wiped 50a. The first predetermined time T1 is measured or calculated in advance in such a manner that the wiper 51 spreads the washer fluid W entirely on the surface to be wiped 50a. The washer command portion 14b maintains the stop state of the wiper 51 during the first predetermined time T1.

After actuating the washer motor 13 for the first predetermined time T1, the washer command portion 14b outputs information that the ejection of the washer fluid W is finished (completed) to the wiper control apparatus 12. As a result, the wiper control apparatus 12 starts causing the wiper 51 to pivot in a reciprocating manner. In the present embodiment, the start of the pivoting motion in a reciprocation manner of the wiper 51 is delayed by a predetermined time T2 from the ejection end of the washer fluid W. When the wiper 51, which pivots in a reciprocating manner, sweeps and spreads the washer fluid W on the surface to be wiped 50a. The wiper control apparatus 12 causes the wiper 51 to pivot in a reciprocating manner only several times, for example, only three times. The washer command portion 14b stops ejecting the washer fluid W during the operation of the wiper 51, until the washer switch 26 is turned on.

Next, a description will be given of an operation at a time when the vehicle runs at a high speed. If the operator turns on the washer switch 26 in the state in which the vehicle speed is equal to or higher than 80 km/h, and the wiper 51 is not in operation, the washer command portion 14b first actuates the washer motor 13 for the first predetermined time T1. In other words, the same amount of washer fluid W as that at a time when the vehicle runs at a low speed is ejected to the surface to be wiped 50a. The stop state of the wiper 51 is maintained until the first predetermine time T1 passes.

If the washer command portion 14b outputs to the wiper control apparatus 12 information that the ejection of the washer fluid W from the wiper 51 positioned at the lower reversing position A1 is finished, the wiper control apparatus 12 starts the wiping motion of the wiper 51.

If the washer command portion 14b detects that the wiper 51 has reached the intermediate ejecting position A3, the washer command portion 14b actuates the washer motor 13 for a third predetermined time T3 for additionally ejecting the washer fluid W. The third predetermined time T3 is set in advance on the basis of a measurement and a calculation in such a manner that the additional ejecting amount of the washer fluid W comes to a preferable amount.

In general, if the wiper blade 51b becomes parallel to the relative wind at a time when the vehicle runs at a high speed, there is a risk that the washer fluid W on the surface to be wiped moves to an upper end of the windshield 50 along the wiper blade 51b. In other words, there is a risk that the fluid W in a portion on the surface to be wiped corresponding to the proximal end 51e of the wiper blade 51b becomes insufficient. However, the present embodiment additionally ejects the washer fluid W at the intermediate ejecting position A3 before the wiper blade 51b becomes parallel to the relative wind. Accordingly, uneven distribution of the washer fluid W on the surface to be wiped 50a is suppressed.

As shown in FIGS. 4A and 4B, a plurality of ejecting portions 51c are structured in advance such that the ejection amount of the washer fluid W is increased toward the proximal end 51e from the distal end 51f of the wiper blade 51b. Specifically, a bore diameter of the ejecting hole in each of the ejecting portions 51c is made larger little by little from the ejecting portion 51c in the distal end 51f of the wiper blade 51b toward the ejecting portion 51c in the proximal end 51e. As a result, the uneven distribution of the washer fluid W on the surface to be wiped 50a is further suppressed. The structure is not limited to the one in which the setting of the bore diameter of the ejecting hole is changed, but the structure may be made such that the number of the ejecting holes is increased little by little from the ejecting portion 51c in the distal end 51f of the wiper blade 51b toward the ejecting portion 51c in the proximal end 51e.

The wiper control apparatus 12 causes the wiper 51 to pivot in a reciprocating manner several times at a time when the vehicle runs at high speed, in the same manner as that at a time when the vehicle runs at low speed. The washer command portion 14b stops ejecting the washer fluid W until the washer switch 26 is turned on after the ejection from the wiper 51 at the intermediate ejecting position A3.

The embodiment mentioned above has the following advantages.

(1) If the washer control apparatus 14 determines that the wiper switch 25 is in the OFF state at a time when the washer switch 26 is turned on, the washer control apparatus 14 ejects the washer fluid W to the surface to be wiped 50a from the wiper 51 positioned at the lower reversing position A1 corresponding to the stop position. The wiper control apparatus 12 causes the wiper 51 to pivot in reciprocating manner only at several times simultaneously with the ejection of the washer fluid W from the wiper 51 positioned at the lower reversing position A1. In the case where the washer control apparatus 14 determines that the vehicle speed is equal to or higher than 80 km/h, if the wiper 51 reaches the intermediate ejecting position A3 on the route to the upper reversing position A2 from the lower reversing position A1, the washer control apparatus 14 additionally ejects the washer fluid W.

Generally, the strong relative wind at a time when the vehicle runs at high speed tends to move the washer fluid W on the surface to be wiped 50a along the wiper blade 51b, in the state in which the wiper blade 51b becomes parallel to the relative wind. In other words, the washer fluid on the surface to be wiped 50a tends to be concentrated at the distal end 51f of the wiper blade 51b. Accordingly, there is a risk that the washer fluid W becomes insufficient in the portion of the surface to be wiped 50a corresponding to the proximal end 51e of the wiper blade 51b. However, if the wiper 51 reaches the intermediate ejecting position A3 on the route to the upper reversing position A2 from the lower reversing position A1, the present embodiment additionally ejects the washer fluid W. Accordingly, it is possible to suppress the uneven distribution of the washer fluid on the surface to be wiped 50a. Therefore, it is possible to sufficiently get the dirt out of the surface to be wiped 50a by the washer fluid W.

Further, in the state in which the wiper blade 51b is positioned at the intermediate ejecting position A3, the ejection of the washer fluid W to the surface to be wiped 50a from the wiper blade 51b means the following matter. That is, on the route to the upper reversing position A2 from the lower reversing position A1 of the wiper blade 51b, the washer fluid W is additionally ejected in the direction of the wiping motion of the wiper blade 51b. In other words, the washer fluid W is additionally ejected toward the upper reversing position A2 before the wiper blade 51b reaches the upper reversing position A2. Accordingly, the wiper blade 51b rapidly wipes the washer fluid W provided to the surface to be wiped 50a on the basis of the additional ejection. In other words, a time when the washer fluid W attached to the surface to be wiped 50a blocks the vehicle passenger's view before the washer fluid W is swept and spread by the wiper blade 51b is significantly short. As a result, the vehicle passenger hardly feels the block of view by the additionally ejected washer fluid W.

(2) The relative wind tends to move the washer fluid W on the surface to be wiped 50a to the distal end 51f along the wiper blade 51b, in the state in which the wiper blade 51b becomes perpendicular to the vehicle width direction. Accordingly, the intermediate ejecting position A3 for additionally ejecting the washer fluid W is set toward the lower reversing position A1 with respect to the position at which the wiper blade 51b becomes perpendicular to the vehicle width direction. Accordingly, it is easy to suppress the lack of the washer fluid W on the surface to be wiped 50a.

(3) After the ejection of the washer fluid W is finished, the wiper control apparatus 12 causes the wiper 51 to pivot in a reciprocating manner once or more times without accompanying the ejection of the washer fluid W. Accordingly, it is possible to inhibit the washer fluid W from being left on the surface to be wiped 50a without being wiped. In other words, it is possible to inhibit the washer fluid W attached onto the surface to be wiped 50a after being ejected from dripping off without being sufficiently swept and spread by the wiper blade 51b.

(4) In the case where the washer switch 26 is continuously turned on for the predetermined time (the first predetermined time T1) or longer, the washer control apparatus 14 continuously ejects the washer fluid W during the ON operation period. Accordingly, in the case where it is necessary to increase the ejecting amount of the washer fluid W, such as the case where the dirt is persistently stuck onto the surface to be wiped 50a, it is possible to obtain an ejecting amount intended by the operator.

(5) The washer fluid on the surface to be wiped 50a tends to be concentrated at the distal end 51f than the proximal end 51e of the wiper blade 51b. Accordingly, the present embodiment structures the ejecting portion 51c in such a manner that the ejecting amount of the washer fluid W becomes more from the proximal end 51e than from the distal end 51f of the wiper blade 51b. Therefore, it is easy to suppress the uneven distribution of the washer fluid W on the surface to be wiped 50a.

The embodiment may be modified as follows.

The position detection of the wiper 51 is not limited to be executed by the rotation sensor 31 included in the wiper motor main body 15. The fixed position stop switch 16 may be structured such that it detects the upper reversing position A2 and the intermediate ejecting position A3.

The number of the arranged positions of the ejecting portions 51c distributed in the longitudinal direction of the wiper blade 51b is not limited to five. The number and the arrangement of the ejecting portions 51c may be appropriately modified.

The ejecting amount of the washer fluid W may be set constant over the longitudinal direction of the wiper blade 51b. However, it is preferable that the ejecting amount of the washer fluid W be more in the proximal end 51e than in the distal end 51f of the wiper blade 51b.

The washer nozzles (the ejecting portions 51c) are not limited to be arranged in the wiper blade 51b, but may be arranged in the wiper arm 51a. The structure of the wiper 51 may be appropriately modified.

A threshold value of the vehicle speed for determining whether the vehicle is running at a low speed or running at a high speed is not limited to 80 km/h, but may be appropriately modified.

The washer control apparatus 14 is not limited to determine the additional ejection of the washer fluid W only on the basis of whether or not the vehicle speed is high. As shown by a broken line in FIG. 2, a temperature determining portion 14e may be provided in the washer control apparatus 14. The temperature determining portion 14e detects an outside air temperature by receiving a signal from a temperature sensor 32 (shown by a broken line) mounted on the vehicle, and determines an evaporation degree of the washer fluid W. In other words, the washer control apparatus 14 may determine whether or not the additional ejection is necessary, taking the evaporation degree of the washer fluid W into consideration.

The lower reversing position A1 is not limited to the position at which the wiper blade 51b becomes parallel to the vehicle width direction, and the upper reversing position A2 is not limited to the position somewhat beyond the position at which the wiper blade 51b becomes perpendicular to the vehicle width direction. In other words, the wiping range of the wiper 51 can be appropriately modified.

Figure 5:
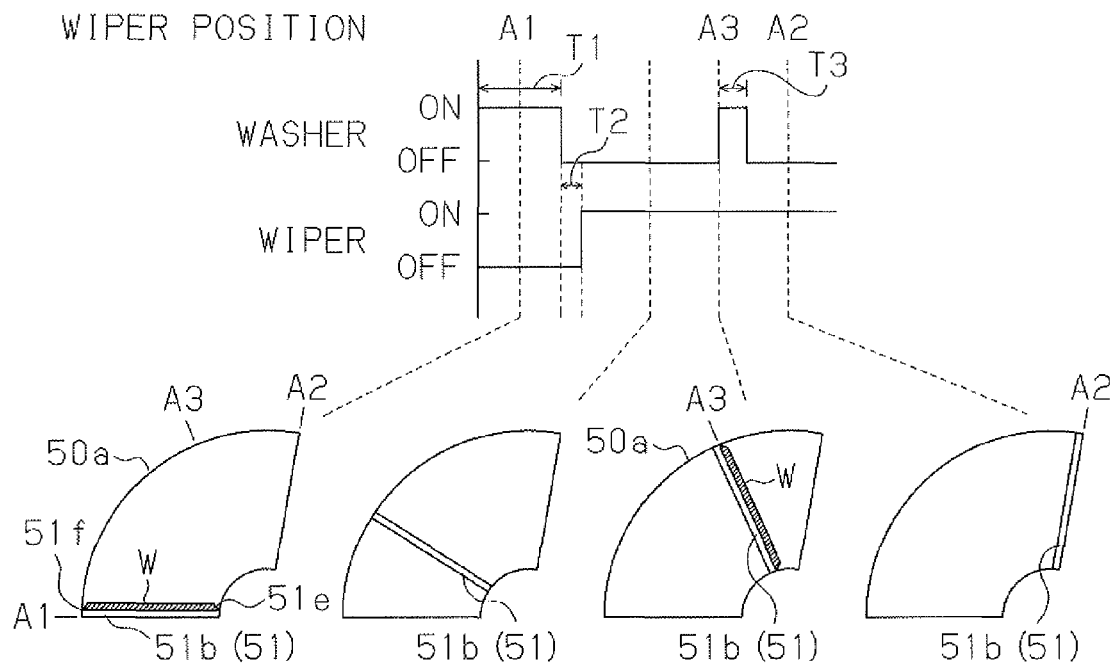
FIG. 5 is a time chart showing the relationship between ejection timing of the washer fluid and the position of the wiper.
Figure 6A:
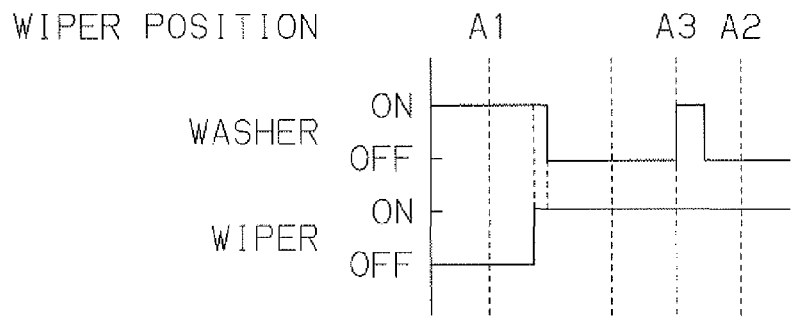
FIG. 6A is a time chart showing the relationship between ejection timing of the washer fluid and the position of the wiper, according to a modified embodiment.
Figure 6B:
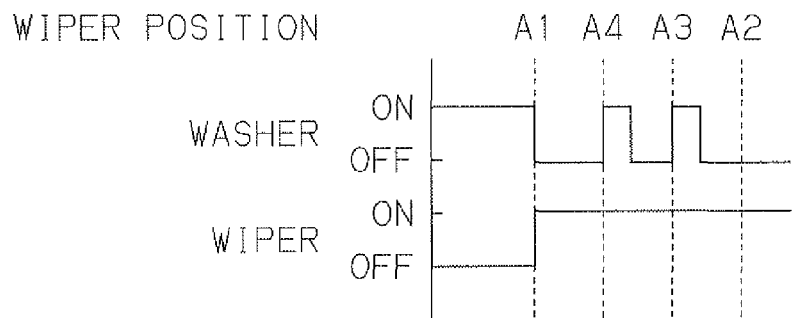
FIG. 6B is a time chart showing the relationship between ejection timing of the washer fluid and the position of the wiper, according to another modified embodiment.

At a timing shown in FIG. 6A, and a timing shown in FIG. 6B, the pivoting motion in a reciprocating manner of the wiper 51 may be performed simultaneously with the ejection of the washer fluid W. In other words, in addition to the timing shown in FIG. 5, it is possible to appropriately modify the ejection finish timing of the washer fluid W, the pivoting in a reciprocating manner start timing of the wiper 51, the position of the wiper at a time of additionally ejecting the washer fluid W, and the frequency of the additional ejection.

In the case shown in FIG. 6A, the wiping of the wiper 51 is started short time before the ejection of the washer fluid W from the wiper 51 positioned at the lower reversing position A1 is finished. In other words, the first predetermined time T1 corresponding to the ejecting period of the washer fluid W somewhat overlaps the period of pivoting in a reciprocating manner of the wiper 51. The case of FIG. 6A is opposite to the case in FIG. 5. In the case of FIG. 5, the pivoting motion in a reciprocating manner of the wiper 51 is delayed (on standby) until the ejection of the washer fluid W is finished.

In the case shown in FIG. 6B, the wiping of the wiper 51 is started at the same time when the ejection of the washer fluid W is finished at the lower reversing position A1. Further, in a state in which the wiper blade 51b is positioned at a second intermediate ejecting position A4 corresponding to a second intermediate position between the intermediate ejecting position A3 and the lower reversing position A1, the washer fluid W is additionally ejected. In other words, the washer fluid W may be additionally ejected twice between the lower reversing position A1 and the upper reversing position A2.

The number of the wiper arm 51a or the wiper blade 51b is not limited to one, respectively, in a vehicle, but plural number of them may be provided over the vehicle width direction. A plurality of wiper arms 51a and a plurality of wiper blades 51b may be mechanically driven synchronously by a link mechanism, or may be electrically driven synchronously by a plurality of wiper motors.

The invention claimed is:

1. A vehicle wiper/washer control apparatus controlling a wiper motor and a washer motor, wherein the wiper motor is driven for wiping a surface to be wiped in a vehicle windshield by a wiper, the wiper reciprocates between a first reversing position and a second reversing position, the wiper is provided with an ejecting portion for ejecting a washer fluid to the surface to be wiped, the washer motor is driven for ejecting the washer fluid from the ejecting portion, the control apparatus drives the washer motor in the case where a washer switch is turned on, the control apparatus comprising:
- a vehicle speed determining portion determining whether or not a vehicle speed is equal to or more than a predetermined speed;
- a wiper determining portion determining whether or not a wiper switch operated for driving the wiper motor is in an OFF state, the wiper being arranged at the first reversing position in the case where the wiper switch is in the OFF state; and
- a simultaneous operation control portion, wherein, if the washer switch is turned on in a state in which the wiper determining portion determines that the wiper switch is in the OFF state and the vehicle speed determining portion determines that the vehicle speed is equal to or more than the predetermined speed, the simultaneous operation control portion ejects the washer fluid in a state in which the wiper is positioned at the first reversing position, and causes the wiper to reciprocate at least once simultaneously with the ejection, and wherein the simultaneous operation control portion additionally ejects the washer fluid at least once in a state in which the wiper is positioned at an intermediate position between the first reversing position and the second reversing position.

2. The wiper/washer control apparatus according to claim 1, wherein the wiper includes a wiper blade that pivots in a reciprocating manner, and the intermediate position is set close to the first reversing position with respect to the position of the wiper blade in a state of extending perpendicularly to a vehicle width direction.

3. The wiper/washer control apparatus according to claim 1, wherein, after finishing the additional ejection of the washer fluid, the simultaneous operation control portion causes the wiper to reciprocate once or more times without accompanying the ejection of the washer fluid.

4. The wiper/washer control apparatus according to claim 1, wherein, in the case where the washer switch is turned on for a predetermined time or more, the simultaneous operation control portion continues the ejection of the washer fluid during the ON operation period.

5. A vehicle wiper/washer apparatus comprising:
- a wiper for wiping a surface to be wiped in a vehicle windshield;
- an ejecting portion provided in the wiper, the ejecting portion ejecting a washer fluid to the surface to be wiped;
- a washer motor driven for ejecting the washer fluid from the ejecting portion;
- a wiper motor driven for reciprocating the wiper between a first reversing position and a second reversing position, the first reversing position is also used as a stop position of the wiper;
- a wiper switch for actuating the wiper;
- a washer switch; and
- a control apparatus driving the washer motor in such a manner as to eject the washer fluid on the basis of an ON operation of the washer switch, wherein the control apparatus comprises:
- a vehicle speed determining portion determining whether or not a vehicle speed is equal to or more than a predetermined speed;
- a wiper determining portion determining whether or not the wiper switch is in an OFF state; and
- a simultaneous operation control portion, wherein, if the washer switch is turned on in a state in which the wiper determining portion determines that the wiper switch is in the OFF state and the vehicle speed determining portion determines that the vehicle speed is equal to or more than the predetermined speed, the simultaneous operation control portion ejects the washer fluid in a state in which the wiper is positioned at the first reversing position, and causes the wiper to reciprocate at least once simultaneously with the ejection, and wherein the simultaneous operation control portion additionally ejecting the washer fluid at least once, in a state in which the wiper is positioned at an intermediate position between the first reversing position and the second reversing position.

6. The wiper/washer apparatus according to claim 5, wherein the wiper includes a wiper blade that pivots in a reciprocating manner, the wiper blade has a proximal end and a distal end having a larger radius of pivoting motion than the proximal end, and the ejecting portion is structured such that an ejecting amount of the washer fluid is larger in the proximal end than in the distal end.

7. The wiper/washer apparatus according to claim 5, wherein the wiper includes a wiper blade that pivots in a reciprocating manner, and the intermediate position is set close to the first reversing position with respect to a position of the wiper blade in a state of extending perpendicular to the vehicle width direction.

8. The wiper/washer apparatus according to claim 5, wherein, after finishing the ejection of the washer fluid, the simultaneous operation control portion reciprocates the wiper once or more times without accompanying the ejection of the washer fluid.

9. The wiper/washer apparatus according to claim 5, wherein, in the case where the washer switch is turned on continuously for a predetermined time or more, the simultaneous operation control portion continues the ejection of the washer fluid during the ON operation period.

* * * * *